United States Patent
Joong et al.

(10) Patent No.: US 6,462,430 B1
(45) Date of Patent: Oct. 8, 2002

(54) HYBRID CAR AND DYNAMO-ELECTRIC MACHINE

(75) Inventors: Kim Houng Joong, Hitachi (JP); Kazuo Tahara, Hitachi (JP); Kou Ajima, Hitachioota (JP); Koki Ueta, Hitachinaka (JP); Toshiyuki Innami, Tsuchiura (JP); Noriaki Hino, Mito (JP); Taizo Miyazaki, Hitachi (JP); Tomoyuki Hanyu, Hitachi (JP); Kousaku Ohno, Chiyoda-machi (JP)

(73) Assignees: Hitachi, Ltd., Tokyo (JP); Hitachi Car Engineering Co., Ltd., Hitachinaka (JP)

(*) Notice: Subject to any disclaimer, the term of this patent is extended or adjusted under 35 U.S.C. 154(b) by 47 days.

(21) Appl. No.: 09/654,081

(22) Filed: Sep. 1, 2000

(30) Foreign Application Priority Data

Sep. 1, 1999 (JP) .......................... 11-246927

(51) Int. Cl.[7] .............................................. H02P 9/04
(52) U.S. Cl. ................................. 290/40 C; 310/114
(58) Field of Search ..................... 290/40 C, 46; 322/51; 310/114, 191

(56) References Cited

U.S. PATENT DOCUMENTS

| | | | | |
|---|---|---|---|---|
| 3,233,133 A | * | 2/1966 | Kober | 310/191 |
| 3,405,296 A | * | 10/1968 | Stilley et al. | 310/112 |
| 3,713,015 A | | 1/1973 | Frister | 322/28 |
| 4,305,031 A | * | 12/1981 | Wharton | 310/114 |
| 4,782,257 A | * | 11/1988 | Secher et al. | 310/114 |
| 4,879,484 A | | 11/1989 | Huss | 310/114 |
| 4,882,513 A | * | 11/1989 | Flygare et al. | 310/114 |
| 5,132,604 A | * | 7/1992 | Shimane et al. | 290/46 |
| 5,200,659 A | * | 4/1993 | Clarke | 310/112 |
| 5,300,848 A | * | 4/1994 | Huss et al. | 310/191 |
| 5,309,081 A | | 5/1994 | Shah et al. | 322/10 |
| 5,675,203 A | * | 10/1997 | Schulze et al. | 310/103 |
| 6,191,561 B1 | * | 2/2001 | Bartel | 322/49 |

FOREIGN PATENT DOCUMENTS

| | | | |
|---|---|---|---|
| EP | 0798844 A1 | * | 10/1997 |
| EP | 0817359 A1 | * | 1/1998 |
| FR | 2191329 | | 2/1974 |
| GB | 2317997 | | 4/1998 |
| JP | 7-298696 | | 11/1995 |
| JP | 9 132042 | | 5/1997 |
| JP | 11178111 | | 7/1999 |
| WO | WO 9218346 A1 | * | 10/1992 ........... B60L/11/12 |
| WO | WO 9939426 A1 | * | 8/1999 |

* cited by examiner

Primary Examiner—Joseph Waks
(74) Attorney, Agent, or Firm—Crowell & Moring LLP

(57) ABSTRACT

A hybrid drive type vehicle having a permanent magnet type synchronous motor can provide high torque characteristics in low revolution speed range of the engine and high power generation characteristics at high revolution speed range of the engine. The hybrid drive type vehicle includes an electric rotary machine being formed with a stator and a rotor. A field magnet of the rotor include a first field magnet and a second field magnet. The first and second field magnets are opposing with a magnetic pole of the stator and having a mechanism for varying a phase of a magnetic pole resulting from combination of the first and second field magnets relative to the magnetic pole of the first field magnet depending upon direction of a torque of the rotor.

10 Claims, 9 Drawing Sheets

HYBRID CAR AND DYNAMO-ELECTRIC MACHINE

BACKGROUND OF THE INVENTION

The present invention relates generally to a hybrid-type electric vehicle. More particularly, the invention relates to an electric rotary machine for driving the hybrid drive type vehicle and generating an electric power, and a control method therefor. Further particularly, the invention relates to an electric rotary machine, in which a rotor of the electric rotary machine is constructed with a first field magnet and a second field magnet, and which is variable of effective flex amount depending upon a direction of torque.

DESCRIPTION OF THE RELATED ART

As a conventional hybrid drive type vehicle, there are (1) a series hybrid type driving a generator by an output torque of an engine as an internal combustion engine for obtaining an electric power and driving a electric rotary machine connected to a wheel axle by the electric power for driving a vehicle by a driving torque generated by the electric rotary machine, and (2) a parallel hybrid type, in which a part of the output torque of the engine is converted into an electric power and remaining output torque is transmitted to the wheel axle as driving torque for driving the vehicle by a driving torque of the electric rotary machine using the generated electric power and the wheel axle driving torque of the engine.

In the recent trend, in view point of sizes and costs for the motor and/or battery, attention is attracted to (2) the parallel hybrid driving type vehicle. For example, as disclosed in Japanese Patent Application Laid-Open No. 9-132042 (1997), a parallel hybrid drive type vehicle of the type wherein the engine and two electric rotary machines are connected to respective shafts of a planetary gear mechanism and a driving force is distributed depending upon load and revolution speed of the engine and respective electric rotary machines (this type will be hereinafter referred to as "two motor system"), has already marketed.

However, such prior art requires two electric rotary machines and two inverter circuits for driving the electric rotary machines and newly arranging the planetary gear mechanism and thus requires significant reconstruction of the vehicle to cause significant increase of the cost associating therewith.

Therefore, as shown in Japanese Patent Application Laid-Open No. 7-298696 (1995), there has been proposed a system, in which an electric rotary machine is directly connected to a crankshaft of the engine for switching driving mode and generating mode in one electric rotary machine (this system will be referred to as "single motor system"). This single electric rotary machine system is advantageous in view point of cost and capability of add-on the existing vehicle.

In both of single motor system and two motor system, as the electric rotary machine, a permanent magnet field type electric rotary machine arranged a permanent magnet on a rotor or a squirrel cage induction electric rotary machine, in which a secondary conductors made of aluminum alloy or copper alloy are arranged on the rotor in cage-like fashion, may be employed.

As set forth above, the single motor system is more advantageous than the two motor systems in viewpoint of the cost. However, the following constraints are present even in the single motor system.

(1) It has to be achieved both of a high torque characteristics in low revolution speed range upon starting-up of the engine and high-power generation characteristics in high revolution speed range.

(2) A revolution speed to generate a torque (maximum torque to be generated by the motor) upon starting-up of the engine is less than or equal to one tenth for a motor revolution speed at the allowable maximum revolution speed of the engine.

(3) The present invention is directed to the electric rotary machine mounted on the vehicle, and as a power source, a battery charging and discharging within a voltage variation range centered at a certain voltage, is employed. Therefore, if a voltage far beyond a charging voltage of the battery is charged, it is possible to damage the battery in the worst case.

SUMMARY OF THE INVENTION

The present invention has been worked out in view of the shortcoming in the prior art as set forth above. It is therefore an object to provide a hybrid drive type vehicle having a permanent magnet type synchronous motor obtainable of high torque characteristics in low revolution speed range of the engine and high power generation characteristics at high revolution speed range of the engine.

According to one aspect of the present invention, a hybrid drive type vehicle comprises:

an internal combustion engine driving a vehicle;

a battery charging and discharging an electric power;

an electric rotary machine mechanically connected with a crankshaft of the internal combustion engine for starting up the internal combustion engine as driven by the electric power supplied from the battery, and driven by revolution of the internal combustion engine for performing generation for charging the battery;

an inverter for controlling driving and generating of the electric rotary machine;

a controller controlling the inverter;

revolution speed detecting means for detecting a revolution speed of the internal combustion engine or the electric rotary machine;

the electric rotary machine being formed with a stator having a primary winding and a rotor having a field magnet, the field magnet being constituted of a first field magnet alternately arranged mutually opposite magnetic poles in sequentially in circumferential direction and a second field magnet capable of causing relative angular displacement relative to the first field magnet and alternately arranged mutually opposite magnetic poles in sequentially in circumferential direction, the first and second field magnets being opposing with a magnetic pole of the stator and having a mechanism for varying a phase of a magnetic pole resulting from combination of the first and second field magnets relative to the magnetic pole of the first field magnet depending upon direction of a torque of the rotor, the mechanism for varying the magnetic pole depending upon the direction of the torque including means for aligning centers of the same magnetic poles of the first and second field magnets by balance between torque direction generated in the rotor and magnetic action between the first and second magnetic and means for causing offset of the center of the same magnet poles of the first and second field magnetic associating with generation of the torque generated in the rotor in the opposite direction.

Operation of one aspect of the invention as set forth above will be discussed.

In FIG. 6, the characteristics of an effective flux relative to a rotational angular velocity of the permanent magnet type synchronous electric rotary machine, an induced electromotive force, and a terminal voltage are shown.

An induced electromotive force $E_O$ of the permanent magnet type synchronous electric rotary machine is determined by a constant magnetic flux $\Phi$ generated by the permanent magnet and rotational angular velocity $\omega$ of the electric rotary machine. Namely, as shown in FIG. 6, when the rotational angular velocity $\omega$ of the electric rotary machine (revolution speed) is increased, the induced electromotive force $E_O$ of the electric rotary machine is proportionally increased. However, as an essential condition in mounting on the vehicle is charging of the battery. In order to charge the battery, the induced electromotive force to be generated in the electric rotary machine has to be suppressed to be lower than or equal to a battery charge voltage so as not to damage the battery. Therefore, in the permanent magnet type synchronous electric rotary machine, it requires to perform weakening field control for reducing magnetic flux generated by the permanent magnet in range of the revolution speed higher than or equal to a predetermined value.

Since the induced electromotive force is increased in proportion to the rotational angular velocity, current for weakening field control has to be increased. Therefore, a large current has to flow through the coil as the primary winding to inherently cause heating of the coil. Therefore, efficiency of the electric rotary machine is lowered in the high revolution speed range to possibly cause demagnetization or so forth of the permanent magnet due to heating beyond cooling capacity.

Therefore, according to one aspect of the present invention, the first field magnet and the second field magnet of the rotor of the electric rotary machine are arranged coaxially for varying the centers of the magnetic poles of the first and second field magnets depending upon the direction of the rotational torque so that the centers of the same magnetic poles of the first and second field magnets are aligned upon serving as an electric motor in the low revolution speed range, such as upon starting up of the engine or the like to provide large effective flux amount by the permanent magnet opposing to the magnetic poles of the stator to attain high torque. Next, upon serving as the generator, when the rotating direction of the rotor is the same, the torque to be applied to the rotor becomes opposite to that applied upon serving as the electric motor to cause offset of the centers of the same magnetic poles of the first and second field magnets to reduce effective flux amount by the permanent magnet opposing the magnetic poles of the stator to attain weakening field effect to obtain high power generation characteristics in high revolution speed range.

In the preferred construction, the electric rotary machine serves as an electric motor at low revolution speed range and having means for aligning centers of the same magnetic poles of the first and second field magnets by balance between torque direction generated in the rotor and magnetic action between the first and second magnetic, and serves as a generator at high revolution speed range and having means for causing offset of the center of the same magnet poles of the first and second field magnetic associating with generation of the torque generated in the rotor in the opposite direction. Also, the electric rotary machine serves as an electric motor at low revolution speed range and having means for aligning the first and second field magnets at an initial position by balance between torque direction generated in the rotor and magnetic action between the first and second magnetic, and serves as a generator at high revolution speed range and having means for causing offset of the center of the same magnet poles of the first and second field magnetic associating with generation of the torque generated in the rotor in the opposite direction, and the mechanism for varying the center of the magnetic pole associating with variation of the torque direction is constructed by rigidly securing the first magnet on a shaft and separating the second field magnet from the shaft, and the shaft and the second field magnet are permitted to cause relative angular offset within an angular range corresponding to circumferential length of one magnetic pole for causing offset of the center of the poles of the first field magnet and the center of the poles of the second field magnet. A stopper may be provided at a position away from the side surface of the second field magnet. A serve mechanism may be provided for displacing the stopper in parallel to the shaft depending upon revolution speed.

According to another aspect of the present invention, an electric rotary machine comprises:

a stator having a primary winding and a rotor having a field magnet, the field magnet being constituted of a first field magnet alternately arranged mutually opposite magnetic poles in sequentially in circumferential direction and a second field magnet capable of causing relative angular displacement relative to the first field magnet and alternately arranged mutually opposite magnetic poles in sequentially in circumferential direction, the first and second field magnets being opposing with a magnetic pole of the stator and having a mechanism for varying a phase of a magnetic pole resulting from combination of the first and second field magnets relative to the magnetic pole of the first field magnet depending upon direction of a torque of the rotor, the mechanism for varying the magnetic pole depending upon the direction of the torque including means for aligning centers of the same magnetic poles of the first and second field magnets by balance between torque direction generated in the rotor and magnetic action between the first and second magnetic and means for causing offset of the center of the same magnet poles of the first and second field magnetic associating with generation of the torque generated in the rotor in the opposite direction.

The mechanism for varying the center of the magnetic pole associating with variation of the torque direction may be constructed by rigidly securing the first magnet on a shaft and separating the second field magnet from the shaft, and the shaft is formed with a threaded portion serving as a bolt and an inner periphery of the second field magnet being formed with a thread for serving as a nut for connection in thread engagement, and a stopper is provided at a position away from the side surface of the second field magnet, and a serve mechanism for displacing the stopper in parallel to the shaft depending upon revolution speed.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DETAILED DESCRIPTION OF THE PREFERRED EMBODIMENTS

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

Figure 1A:
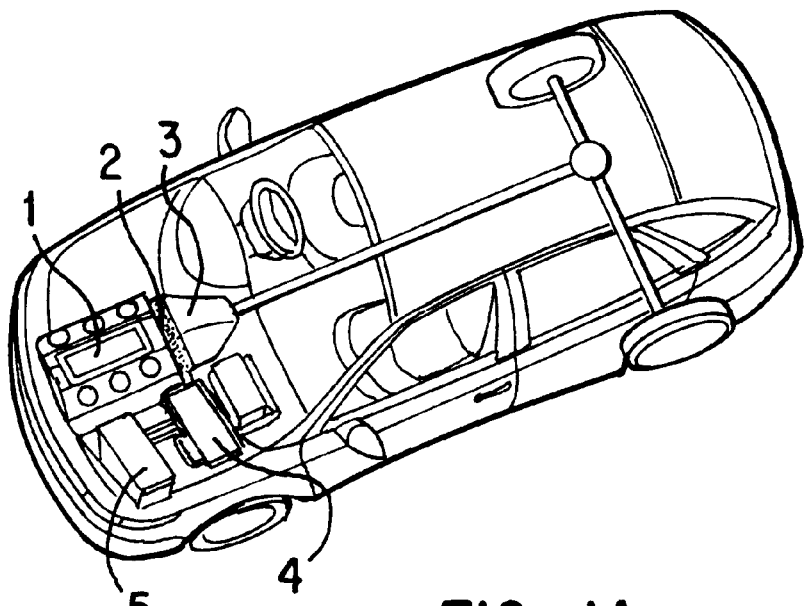
FIG. 1A is a perspective view showing a layout of an electric rotary machine and an engine in the preferred embodiment of a hybrid drive type vehicle according to the present invention.
Figure 1B:
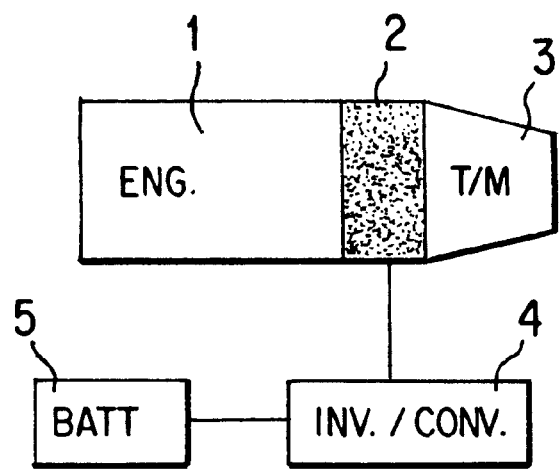
FIG. 1B is a schematic block diagram showing connection between the engine and the electric rotary machine.

FIGS. 1A and 1B show a layout of the preferred embodiment of a permanent magnet type synchronous electric rotary machine (direct connection type) according to the present invention. The preferred embodiment of a permanent magnet type synchronous electric rotary machine 2 is arranged between an engine 1 as an internal combustion engine for generating a driving force of a vehicle and a power transmission 3 of the vehicle. A crankshaft (not shown) of the engine 1 and a shaft (shaft 22 of a rotor in FIG. 2) of the permanent magnet type synchronous electric rotary machine 2 are connected directly or mechanically via a speed changer constructed by a planetary gear speed reducer.

On the other hand, the shaft of the permanent magnet type synchronous electric rotary machine 2 and an input shaft of the power transmission 3 are directly connected via a clutch (not shown) or a torque converter (not shown) as a fluid coupling shutting off a driving force.

By constructing as set forth above, by operating the clutch or torque converter, the shown embodiment of the permanent magnetic type synchronous electric rotary machine 2 can start-up the engine 1. After starting up the engine 1, by operating the clutch and the torque converter, a driving force of the engine 1 can be transmitted to the input shaft of the power transmission 3. In conjunction therewith, driving forces of the engine 1 and the permanent magnet type synchronous electric rotary machine 2 are transmitted to the input shaft of the power transmission 3.

On the other hand, the permanent magnet type synchronous electric rotary machine 2 is electrically connected to a battery 5 via an inverter 4 for serving as an electric motor as assisting starting up of the engine 1.

Upon power generation, an electric force generated in the permanent magnet type synchronous electric rotary machine 2 is converted into a direct current by the inverter 4 for charging the battery 5.

Figure 2:
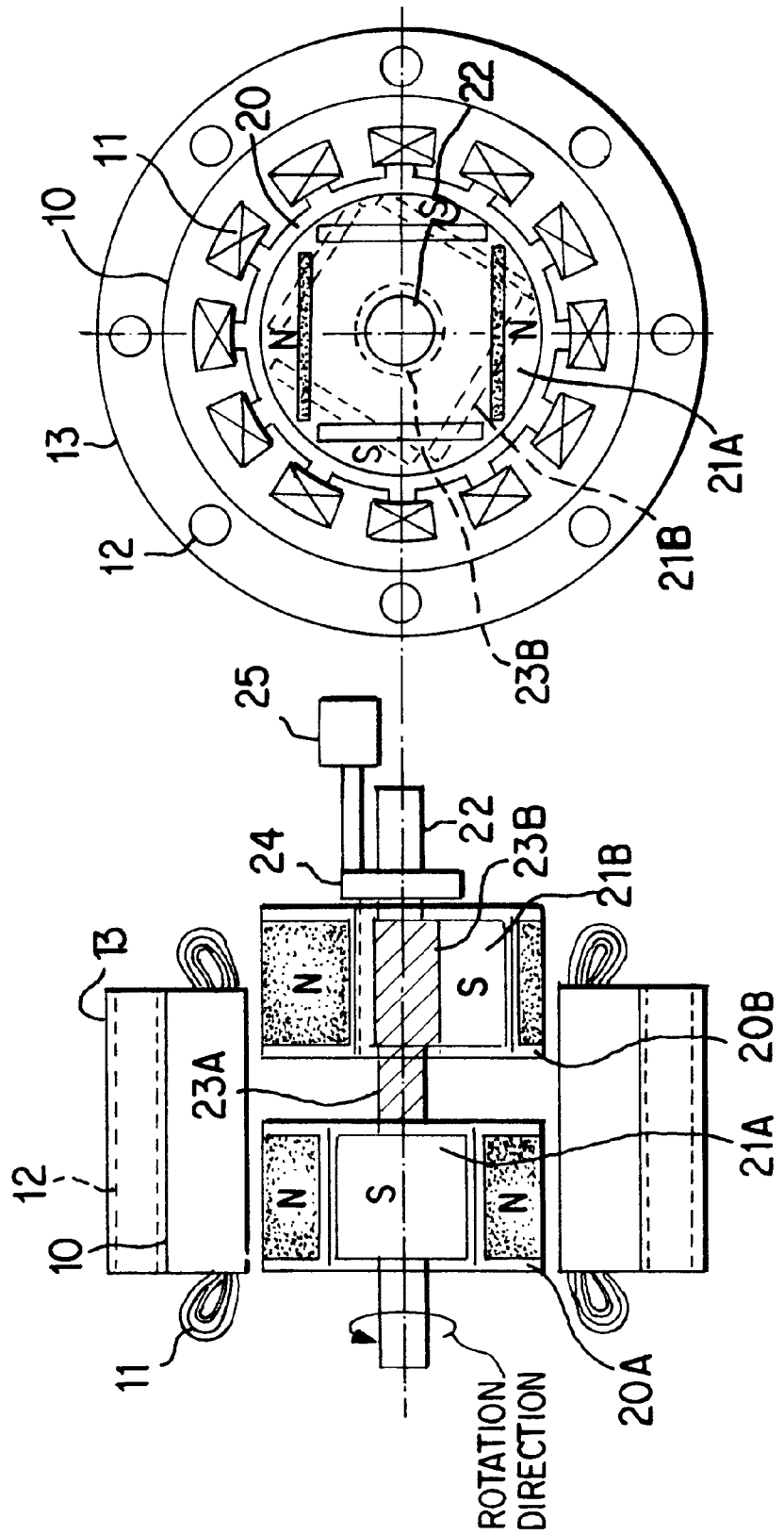
FIG. 2 is a diagrammatic illustration showing a case where a center of the same pole of the rotor of the electric rotary machine of FIG. 1 is offset.

FIG. 2 shows general construction showing the case where a center of the same pole of the rotor of the electric rotary machine of FIG. 1 is offset. On an iron core 10 of a stator, armature coils 11 are coiled within slots. The iron core 10 of the stator is shrink-fitted in a housing 13 which is formed with a cooling water passage 12 for flowing a cooling water therein. Here, securing method of the stator iron core 10 and the housing 13 is not limited to shrink-fitting but can be pressure fitting or so forth.

A permanent magnet embedded type rotor 20 is formed with a first rotor 20A fixed on the shaft 22 and a second rotor 20B separated from the shaft 22. Of course, the rotor can be not only the permanent magnet embedded type rotor but also a surface magnet type rotor.

On the first rotor 20A, permanent magnets 21A having magnetic poles of alternate polarities are arranged in circumferential direction. Similarly, on the second rotor 20B, permanent magnets 21B having magnetic poles of alternate polarities are arranged in circumferential direction. Field magnets of the first and second rotors are opposed to magnetic poles of the stator.

Inner periphery of the second rotor 20B is threaded to form a nut, and a corresponding portion of the shaft is also threaded to form a bolt for permitting mutual engagement between the second rotor 20B and the shaft by thread engagement.

On the other hand, for preventing the second rotor 20B from offsetting beyond a predetermined displacement magnitude from the center of the stator, a stopper 24 is provided at a position away from a side surface of the second rotor 20B. Furthermore, a stopper driving actuator 25 serving a servo mechanism is provided for shifting the stopper 24 in axial direction in parallel to the shaft for controlling effective flux amount depending upon rotation speed.

By constructing as set forth above, the effective magnetic flux amount of the permanent magnet can be varied depending upon direction of the torque.

Basically, in the electric rotary machine having the armature coil on the stator and the permanent magnet on the rotor, when the rotating direction of the rotor is the same either upon acting as the electric motor or as the generator, torques to be applied to the rotor is in the opposite direction upon acting as the electric motor or as the generator.

When the basic theory set forth above is applied to the preferred embodiment of the electric rotary machine according to the present invention, the following effects can be obtained.

Figure 3:
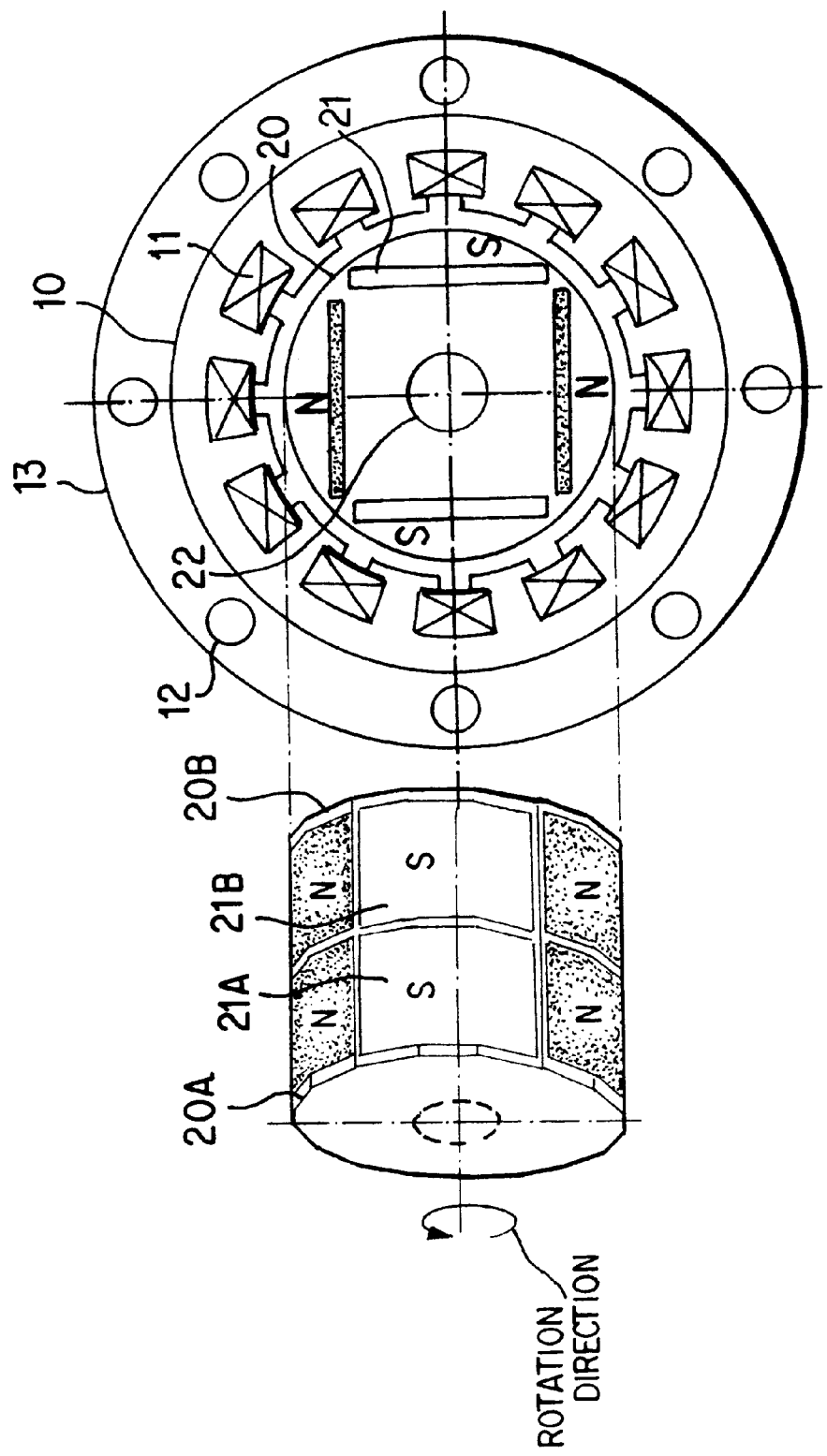
FIG. 3 is a diagrammatic illustration showing a case where a center of the same pole of the rotor of the electric rotary machine of FIG. 1 is aligned.

When the electric rotary machine is operated as the electric motor at low revolution speed range, such as starting up of the engine or the like, the centers of the same magnetic pole of the first rotor 20A and the second rotor 20B are aligned to make the effective flux amount of the permanent magnet opposing the magnetic pole of the stator maximum to obtain high torque characteristics, as shown in FIG. 3.

Next, upon acting as the generator, when the rotating directions of the rotors are the same, directions of the torques to be applied to the rotors are opposite to the case acting as the electric motor. Then the second rotor 20B is rotated relative to the shaft 22 in loosening direction to move away from the first rotor 20A to widen a distance between the first rotor 20A and the second rotor 20B to cause offset of the center of the same poles to reduce effective flux amount of the permanent magnet opposing the magnetic pole of the stator. Thus, field weakening effect can be achieved to obtain high power generation characteristics in the high revolution speed range.

Figure 4:
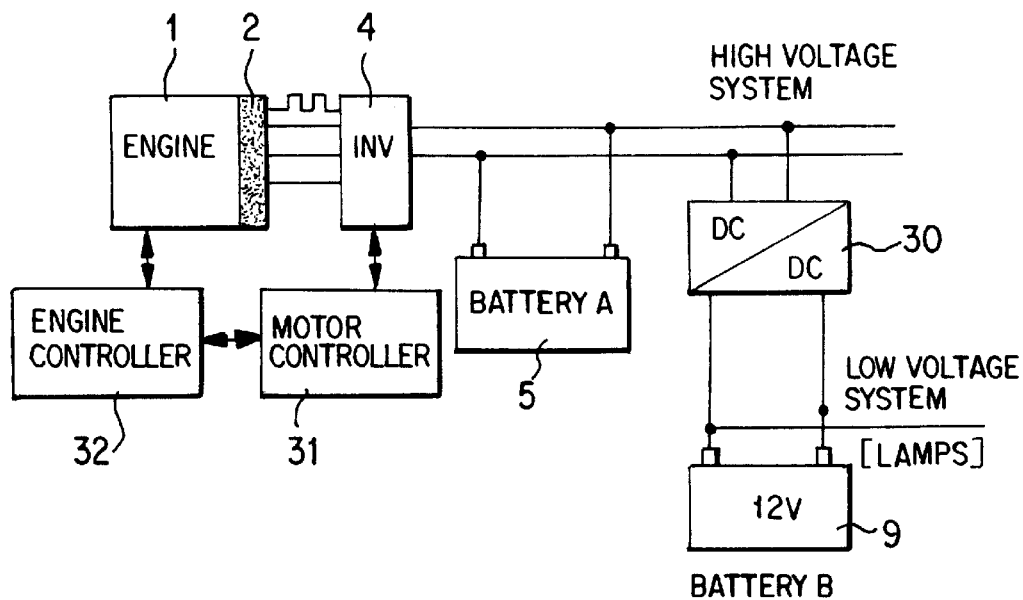
FIG. 4 is a block diagram showing a power source system of the electric rotary machine of FIG. 1.
Figure 6:
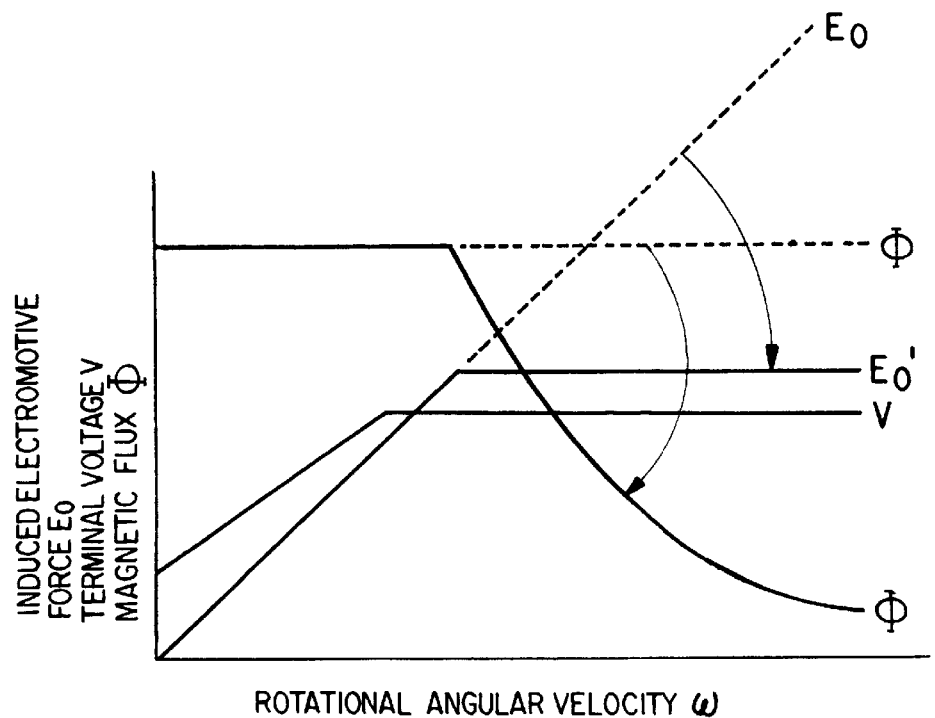
FIG. 6 is a chart showing variation characteristics relative to rotational angular velocity of the electric rotary machine of FIG. 1.

FIG. 4 is a block diagram of a power source system of the electric rotary machine of FIG. 1.

Three-phase terminal of the permanent magnet type synchronous electric rotary machine 2 mechanically connected to the engine 1, is electrically connected to the inverter 4. A direct current side terminal of the inverter 4 is connected to the battery 5 and to other high voltage system. On the other hand, in the shown embodiment, low voltage system for a head lamp, audio and so forth is provided. Power supply for the low voltage system is performed by lowering the voltage from the high voltage system by DC-DC converter 30 for supplying a low voltage battery 9 and other low voltage drive devices (head lamp, audio and so forth). Depending upon drive mode of the vehicle, the permanent magnetic type synchronous electric rotary machine 2 is switched between driving mode and generating mode. Switching of mode and supplying of a command value to the permanent magnet type synchronous electric rotary machine 2 is performed by performing arithmetic operation and judgment by a controller 11 for outputting the command value to the inverter 4 for controlling the permanent magnet type synchronous electric rotary machine 2. On the other hand, a controller 31 performs cooperative control of the permanent magnet type synchronous electric rotary machine 2 and the engine 1 by making the command value output to the inverter 4 common with an engine controller 32 controlling a throttle valve open degree, fuel injection amount and so forth of the engine through communication, direct memory access or so forth.

Next, discussion will be given for control performed in the controller 31.

Figure 5:
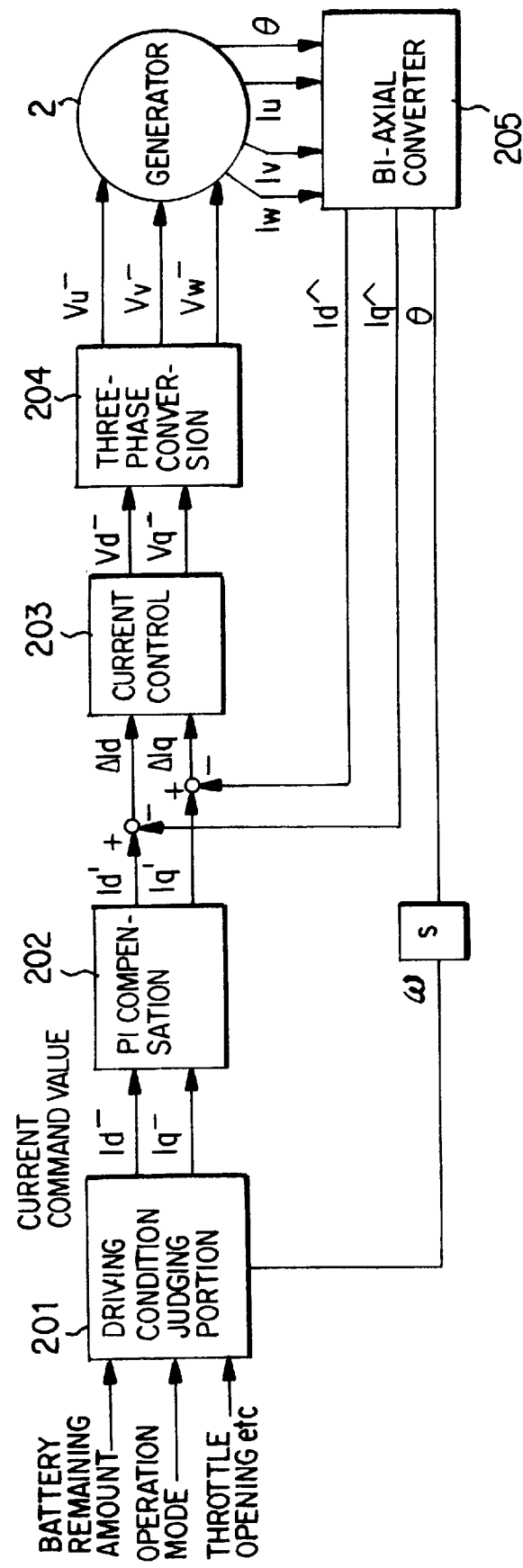
FIG. 5 is a block diagram showing a control system of the electric rotary machine of FIG. 1.

FIG. 5 is a block diagram showing a control system for the electric rotary machine of FIG. 1.

At first, on the basis of information (battery remaining capacity, drive mode, throttle valve open degree and so forth) from the engine controller (32 of FIG. 4) and independently installed sensor and revolution speed of the permanent magnet type synchronous electric rotary machine 2, a driving condition judging portion 201 makes judgment of driving operation of the permanent magnet type synchronous electric rotary machine 2 to output a current command value. The current command value output from the driving condition judging portion 201 is input to a current control block 203 performing anti-interference control or so forth with reference to a difference with an instantaneous current value of the permanent magnet type synchronous electric rotary machine 2 through a PID compensation block 202.

Output of the current control block 203 is converted into a three-phase alternating current to control the permanent magnet type synchronous electric rotary machine 2 via the inverter. On the other hand, the currents of respective phases (currents of at least two phases) of the permanent magnet type synchronous electric rotary machine 2 and revolution speed (or engine revolution speed, or in the alternative, multiplied value of the engine revolution speed) are detected. The current in each phase is converted into a biaxial current by a biaxial converter block 205 for feeding back to the current command value. On the other hand, the revolution speed is input to the driving condition judging portion 201 to be information for judgment of driving condition.

Figure 7:
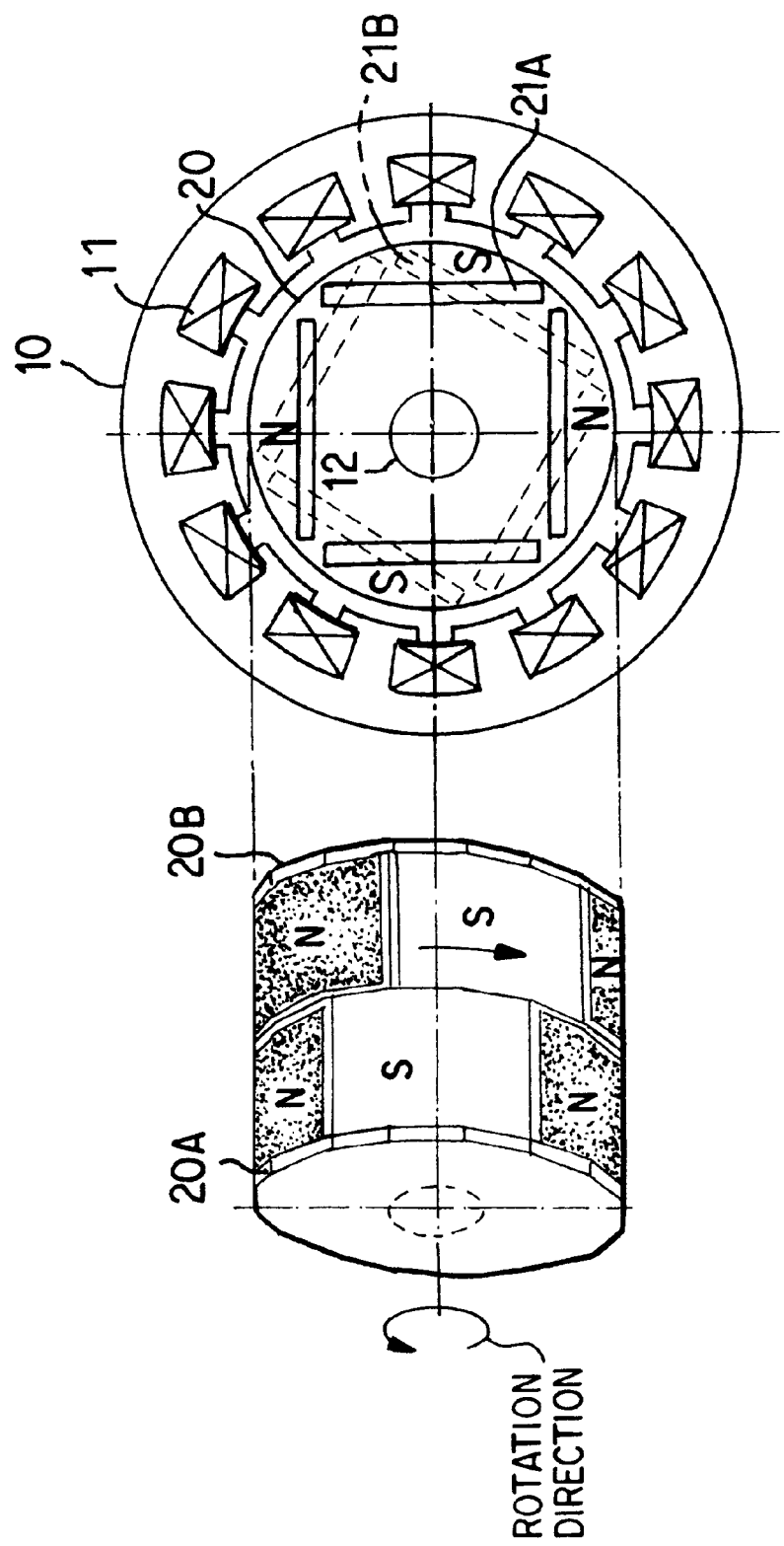
FIG. 7 is an illustration showing another embodiment of the electric rotary machine according to the present invention.

FIG. 7 shows another embodiment of the electric rotary machine according to the present invention.

The shown embodiment is characterized by a mechanism permitting angular displacement of the second rotor for angle θ instead of providing the thread 23 in the second rotor shown in FIG. 2.

Figure 8:
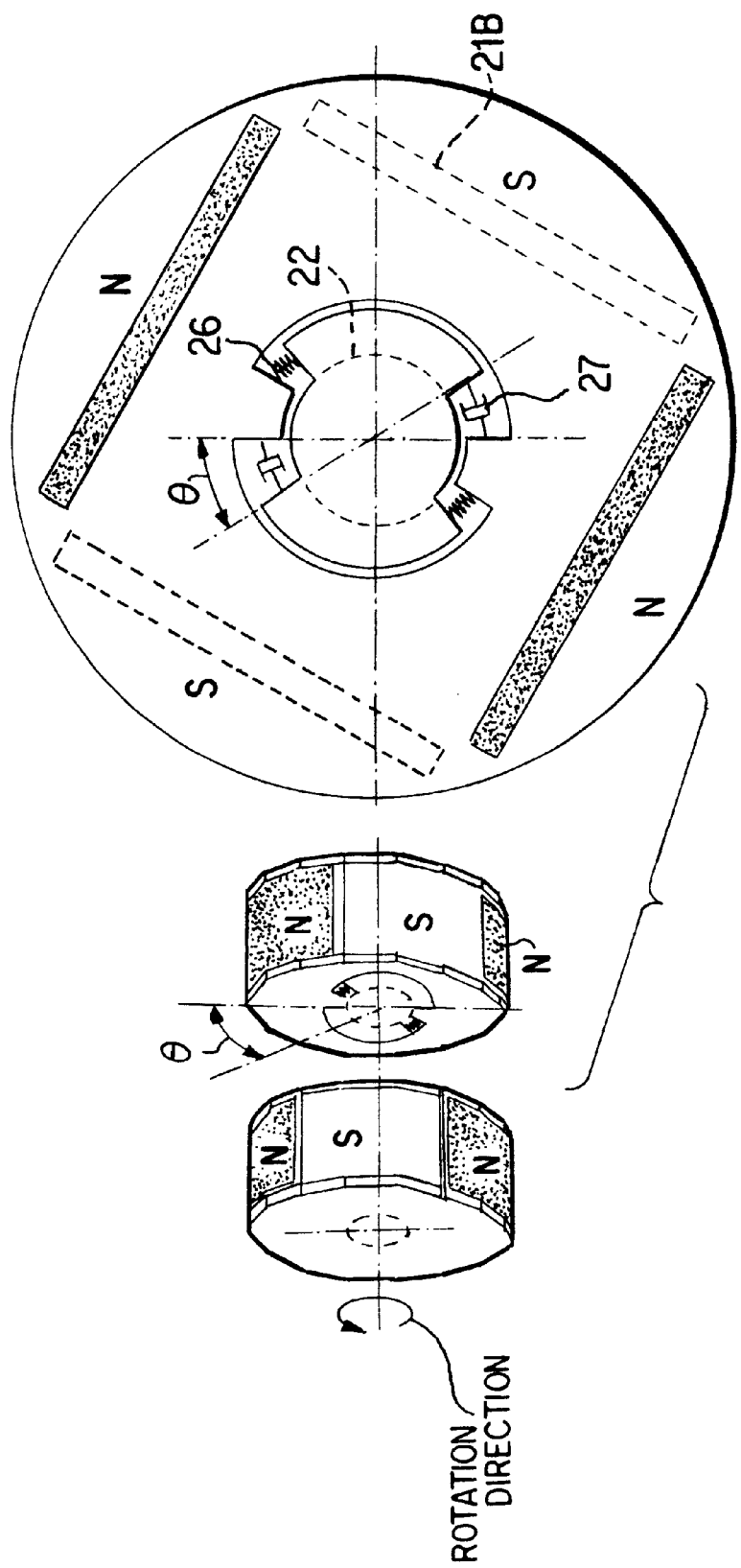
FIG. 8 is a general illustration of a rotor of the electric rotary machine of FIG. 7.

FIG. 8 is general illustration of the rotor of the electric rotary machine of FIG. 7.

In place of the threaded portion of the second rotor shown in FIG. 2, a gear teeth like toothing is provided on the shaft 22 and complementary toothing is formed on the inner periphery of the second rotor 20B for engagement with the shaft. The pitch of the teeth is greater than the width of the teeth so that the shaft inserted into the second rotor 20B is permitted to cause relative angular displacement for the predetermined angle θ. Furthermore, by disposing a spring 26 and a dumper 27 between mating teeth and groove for damping abrupt collision.

Figure 9A:
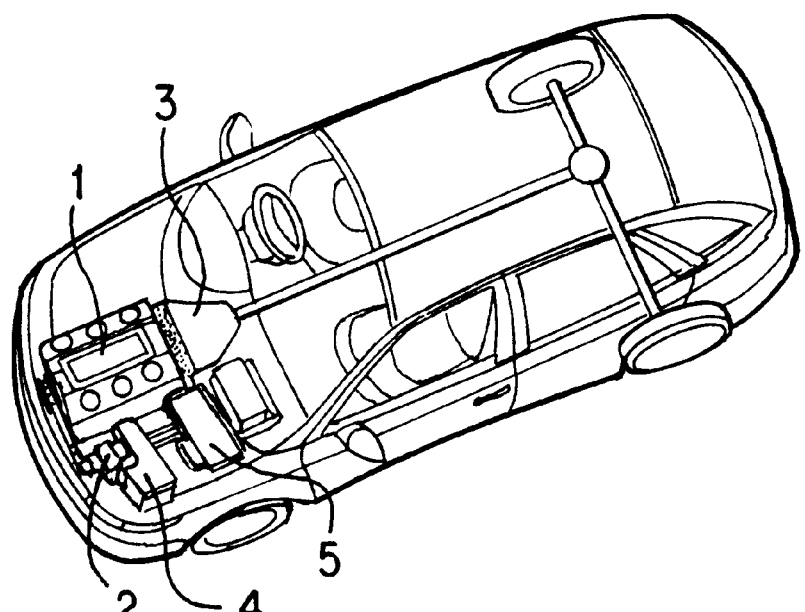
FIG. 9A is a perspective view showing a layout of an electric rotary machine and an engine in another embodiment of a hybrid drive type vehicle according to the present invention.
Figure 9B:
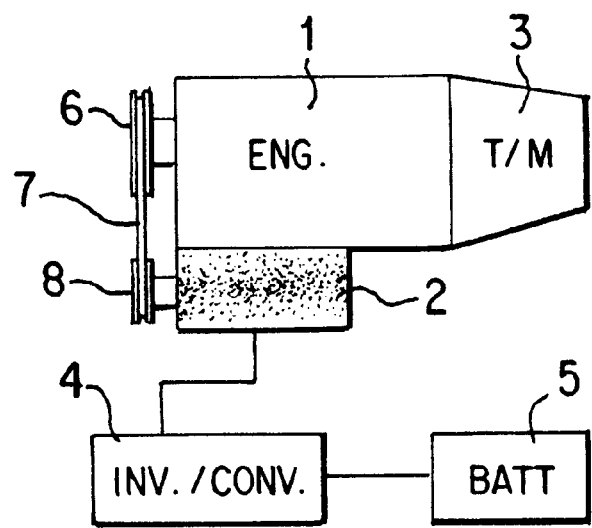
FIG. 9B is a schematic block diagram showing connection between the engine and the electric rotary machine.

FIG. 9 shows a layout of the electric rotary machine and the engine of another embodiment of the present invention (transverse type). The engine 1 and the permanent magnet type synchronous electric rotary machine 2 are connected by a metal belt 7 wound around a crank pulley 6 and a pulley 8 rigidly secured on the shaft of the permanent magnet type synchronous electric rotary machine 2. It should be appreciated that the crank pulley 6 and the pulley 8 may also be connected by a chain, cogged belt and the like. Also, in place of the crank pulley 6 and the pulley 8, a gear may also be used.

Advantage of the construction as illustrated in FIG. 9 is presence of a speed change mechanism having a speed ratio between the engine 1 and the permanent magnet type synchronous electric rotary machine 2 by the crank pulley 6, the metal belt 7 and the pulley 8 interposed between the engine 1 and the permanent magnet type synchronous electric rotary machine 2. For example, by setting the radius ratio of the crank pulley 6 and the pulley 8 at 2:1, the permanent magnet type synchronous electric rotary machine 2 is driven at a speed double of the engine 1. Associating with this, upon starting up of the engine 1, the permanent magnet type synchronous electric rotary machine 2 is required to generate a half of the torque required for starting up of the engine 1. Therefore, it becomes possible to form the permanent magnet type synchronous electric rotary machine 2 compact. Other electrical connection and function are the same as those discussed in connection with FIG. 5.

The permanent magnet type synchronous electric rotary machine according to the present invention is constructed by dividing the rotor into the first field magnet and the second field magnet arranged coaxially and for varying the center of the magnetic poles of the first and second field magnets to vary the effective flux amount by the permanent magnet opposing to the stator magnetic pole.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

Figure 10:
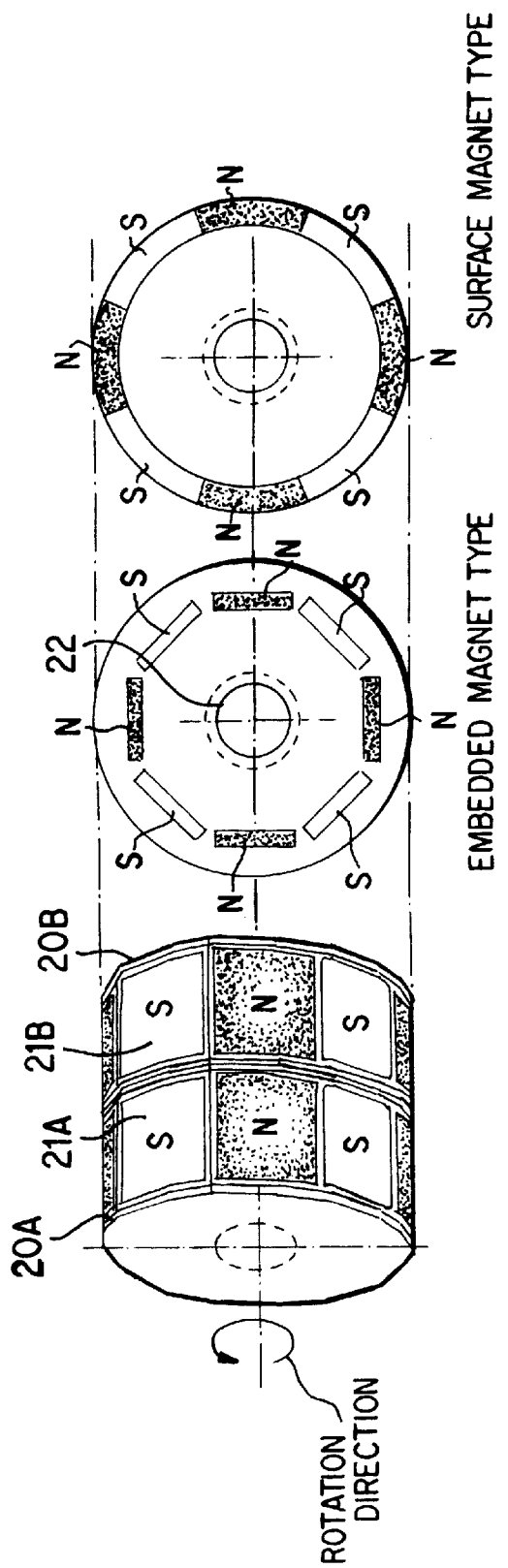
FIG. 10 is a general illustration of a rotor of the electric rotary machine of another embodiment of the present invention.

For instance, while the foregoing discussion has been given for the permanent magnet type synchronous electric rotary machine having four magnets, the present invention is applicable for the electric rotary machine having two or six magnets. For example, FIG. 10 shows the case where the present invention is applied for the permanent magnet type synchronous electric rotary machine having eight magnets. Needless to say, the rotor may be either embedded magnet type or surface magnet type.

What is claimed is:

1. A hybrid drive type vehicle comprising:
   an internal combustion engine driving a vehicle;
   a battery for charging and discharging an electric power;
   an electric rotary machine mechanically connected with a crankshaft of said internal combustion engine for starting up said internal combustion engine as driven by the electric power supplied from said battery, and driven by revolution of said internal combustion engine for performing generation for charging said battery;
   an inverter for controlling driving and generating of said electric rotary machine; and
   revolution speed detecting means for detecting a revolution speed of said internal combustion engine or said electric rotary machine;
   said electric rotary machine being formed with a stator having a primary winding and a rotor having a field magnet, said field magnet being constituted of a first field magnet with alternately arranged mutually opposite magnetic poles sequentially in a circumferential direction, and a second field magnet capable of relative angular displacement relative to said first field magnet, with alternately arranged mutually opposite magnetic poles sequentially in the circumferential direction, said first and second field magnets opposing a magnetic pole of said stator, and said electric rotary machine having a mechanism for varying a phase of a magnetic pole resulting from a combination of said first and second field magnets relative to the magnetic pole of said first field magnet, depending upon a direction of a torque of the rotor,
   said mechanism for varying the phase of the magnetic pole depending upon the direction of the torque including means for aligning centers of the same magnetic poles of said first and second field magnets by balance between torque direction generated in the rotor and magnetic action between said first and second field magnets, and having means for causing offset of the center of the same magnet poles of said first and second field magnets associating with generation of the torque generated in the rotor in the opposite direction.

2. A hybrid drive vehicle as set forth in claim 1, wherein:
   said electric rotary machine serves as an electric motor at low revolution speed range, and has means for aligning centers of the same magnetic poles of said first and second field magnets by balance between torque direction generated in the rotor and magnetic action between said first and second magnetic; and
   said electric rotary machine serves as a generator at high revolution speed range and having means for causing offset of the center of the same magnet poles of said first and second field magnetic associating with generation of the torque generated in the rotor in the opposite direction.

3. A hybrid drive type vehicle as set forth in claim 2, wherein:
   said electric rotary machine serves as an electric motor at low revolution speed range and has means for aligning said first and second field magnets at an initial position by balance between torque direction generated in the rotor and magnetic action between said first and second magnetic;
   said electric rotary machine serves as a generator at high revolution speed range and has means for causing offset of the center of the same magnet poles of said first and second field magnets associating will generation of the torque generated in the rotor in the opposite direction; and
   said mechanism for varying the center of the magnetic pole associating with variation of the torque direction is constructed by rigidly securing said first magnet on a shaft and separating said second field magnet from said shaft, said shaft and said second field magnet being permitted to cause relative angular offset within an angular range corresponding to circumferential length of one magnetic pole for causing offset of the center of the poles of the first field magnet and the center of the poles of the second field magnet.

4. A hybrid drive type vehicle as set forth in claim 2, wherein:
   said electric rotary machine serves as an elect motor at low revolution speed range and has means for aligning said first and second field magnets at an initial position by balance between torque direction generated in the rotor and magnetic action between sad first and second field magnets;
   said electric rotary machine serves as a generator at high revolution speed range and has means for causing offset of the center of the same magnet poles of said first and second field magnets associating with generation of the torque generated in the rotor in the opposite direction; and
   said mechanism for varying the center of the magnetic pole associating with variation of the torque direction is constructed by rigidly securing said first field magnet on a shaft and separating said second field magnet from said shaft, said shaft being formed with a threaded portion serving as a bolt and an inner periphery of said second field magnet being formed with a thread for serving as a nut for connection in thread engagement, and a stopper being provided at a position away from the side surface of said second field magnet.

5. A hybrid drive type vehicle as set forth in claim 4, wherein:
   said mechanism for varying the center of the magnetic pole associating with variation of the torque direction is constructed by rigidly securing said first field magnet on a shaft and separating said second field magnet from said shaft, said shaft being formed with a threaded portion serving as a bolt and an inner periphery of said second field magnet being formed with a thread for serving as a nut for connection in thread engagement;

a stopper is provided at a position away from the side surface of said second field magnet; and a servo mechanism is provided for displacing said stopper in parallel to said shaft depending upon revolution speed.

6. A hybrid drive type vehicle as set fort in claim 1, wherein:

said electric rotary machine serves as an electric motor at low revolution speed range, and has means for aligning said first and second field magnets at an initial position by balance between torque direction generated in the rotor and magnetic action between said fast and second field magnets;

said electric rotary machine serves as a generator at high revolution speed range, and has means for causing offset of the center of the same magnet poles of said first and second field magnets associating with generation of the torque generated in the rotor in the opposite direction; and said mechanism for varying the center of the magnetic pole associating with variation of the torque direction is constructed by rigidly securing said first field magnet on a shaft and separating said second field magnet from said shaft, said shaft and said second field magnet being permitted to cause relative angular offset within a angular range corresponding to a circumferential length of one magnetic pole for causing offset of the center of the poles of the first field magnet and the center of the poles of the second field magnet.

7. A hybrid drive type vehicle as set forth in claim 1, wherein:

said electric rotary machine serves as an electric motor at low revolution speed range and has means for aligning said first and second field magnets at an initial position by balance between torque direction generated in the rotor and magnetic action between said first and second magnetic;

said electric rotary machine serves as a generator at high revolution speed range and has means for causing offset of the center of the same magnet poles of said first and second field magnets associating with generation of the torque generated in the rotor in the opposite direction; and said mechanism for varying the center of the magnetic pole associating with variation of the torque direction is constructed by rigidly securing said first magnet on a shaft and separating said second field magnet from said shaft, said shaft being formed with a threaded portion serving as a bolt and an inner periphery of said second field magnet being formed with a thread for serving as a nut for connection in thread engagement, and a stopper being provided at a position away from the side surface of said second field magnet.

8. A hybrid drive type vehicle as set forth in claim 7, wherein:

said mechanism for varying the center of the magnetic pole associating with variation of the torque direction is constructed by rigidly securing said first field magnet on a shaft and separating said second field magnet from said shaft, said shaft being formed with a threaded portion serving as a bolt and an inner periphery of said second field magnet being formed with a thread for serving as a nut for connection in thread engagement; and a stopper is provided at a position away from the side surface of said second field magnet; and a servo mechanism is provided for displacing said stopper in parallel to said shaft depending upon revolution speed.

9. An electric rotary machine comprising:

a stator having a primary winding and a rotor having a field magnet arrangement, said field magnet arrangement being constituted of a first field magnet with alternately arranged mutually opposite magnetic poles sequentially in circumferential direction, and a second field magnet capable of relative angular displacement relative to said first field magnet, with alternately arranged mutually opposite magnetic poles sequentially in circumferential direction, said first and second field magnets opposing a magnetic pole of said stator, said electric rotary machine having a mechanism for varying a phase of a magnetic pole resulting from a combination of said first and second field magnets relative to the magnetic pole of said first field magnet, depending upon a direction of a torque of the rotor, said mechanism for varying the phase of the magnetic pole depending upon the direction of the torque including means for aligning centers of the same magnetic poles of said first and second field magnets by balance between torque direction generated in the rotor and magnetic action between said first and second field magnets, and having means for causing offset of the center of the same magnet poles of said first and second field magnets associating with generation of the torque generated in the rotor in the opposite direction.

10. An electric rotary machine as set forth in claim 9, wherein:

said mechanism for varying the center of the magnetic pole associating with variation of the torque direction is constructed by rigidly securing said first field magnet on a shaft and separating said second field magnet from said shaft, said shaft being formed with a threaded portion serving as a bolt and an inner periphery of said second field magnet being formed with a thread for serving as a nut for connection in thread engagement;

a stopper is provided at a position away from the side surface of said second field magnet; and a servo mechanism is provided for displacing said stopper in parallel to said shaft depending upon revolution speed.

* * * * *